United States Patent [19]
McDonough et al.

[11] 3,928,226

[45] Dec. 23, 1975

[54] MULTI-DETECTABLE INK COMPOSITIONS AND METHOD OF USE

[75] Inventors: William F. McDonough, Trumbull; James A. Montlick, Darien; Richard A. Bernard, Norwalk, all of Conn.

[73] Assignee: Pitney-Bowes, Inc., Stamford, Conn.

[22] Filed: Jan. 16, 1974

[21] Appl. No.: 433,806

[52] U.S. Cl............... 252/301.2 R; 106/21; 117/12; 250/461; 252/301.3 R
[51] Int. Cl.² .......................................... C09D 5/22
[58] Field of Search ............. 252/301.2 R, 301.3 R; 106/21

[56] References Cited
UNITED STATES PATENTS

| | | | |
|---|---|---|---|
| 2,763,785 | 9/1956 | Switzer | 252/301.2 R |
| 2,938,873 | 5/1960 | Kazenas | 252/301.2 R |
| 2,950,050 | 8/1960 | Mazer et al. | 252/301.2 R |
| 3,066,105 | 11/1962 | McCafferty | 252/301.2 R |
| 3,198,741 | 8/1965 | Kazenas | 252/301.2 R |
| 3,303,168 | 2/1967 | Kazenas | 252/301.2 R |
| 3,412,035 | 11/1968 | McIntosh et al. | 252/301.2 R |
| 3,455,856 | 7/1969 | Voedisch et al. | 252/301.2 R |
| 3,518,205 | 6/1970 | Vukasovich | 252/301.2 R |
| 3,560,238 | 2/1971 | Rothery | 106/21 |
| 3,741,907 | 6/1973 | Beyerlin | 252/301.2 R |
| 3,804,774 | 4/1974 | Betts et al. | 252/301.2 R |

*Primary Examiner*—Arthur P. Demers
*Attorney, Agent, or Firm*—William D. Soltow, Jr.; Albert W. Scribner; Peter Vrahotes

[57] ABSTRACT

Inks are disclosed wherein the ordinary mixed light color of the ink is a color substantially different than the fluorescent color of the ink. Methods of use include detection of at least the fluorescent wavelength of the ink or detection of both the ink colors when irradiated for fluorescence and by exposure to mixed light.

4 Claims, No Drawings

MULTI-DETECTABLE INK COMPOSITIONS AND METHOD OF USE

BACKGROUND OF THE INVENTION

In the machine processing of various types of information contained on tickets, tags, labels, postage imprints and the like it is generally known to employ detectors which are responsive to shape relationships and/or colors, and in many cases to the fluorescence of an ink which may be excited, for example, by ultraviolet light. Fluorescent inks and dyes have long been known as, for example, those disclosed in U.S. Pat. Nos. 2,681,317; 2,763,785; 3,230,221; 3,412,104; 3,452,075; and 3,560,238. The fluorescent inks and the methods of making or using them as known in the prior art, generally entail the use of a fluorescent ink which, when irradiated, will fluoresce and emit radiation within the wavelength for the particular fluorescent color of that dye or ink. It is known, for example, in the postage meter art to provide a red fluorescent ink for machine reading of processed mail.

The fluorescent detectors, however, are generally designed or set to pick up emissions only within a certain range of wavelengths and accordingly, the coloration of the ink will be dependent upon the formulation which provides for fluorescence under light such as ultraviolet light, to emit radiation of a certain wavelength.

It is desirable, however, to provide tickets, tags, labels, postage meter imprints, stampings, or the like with a greater variety of visual color for classification, for inventory purposes or sorting, for example, so that the tags, tickets, envelopes and the like are, or may be, processed visually by people, as well as by one or more machines. A problem arises, however, when a variety of visual colors are used since the visual color is generally related to the fluorescent color of the ink when it is irradiated. Thus, if there is a mixture of different tags, tickets, or letters which are to be machine read, the machine must be responsive to a broad spectrum of emission wavelengths or the machine must be adjusted to receive the wavelengths of the various fluorescent ink colors as they are processed.

Accordingly, it is an object of the invention to provide means for having two different colors contained in the same ink, one an ordinary mixed light color and the other a fluorescent color.

Other objects of the invention will in part be obvious and will in part appear hereinafter.

The invention accordingly comprises a method and a composition of matter possessing the characteristics, properties, and the relation of components which will be exemplified in the composition and the method of use thereof hereinafter described, and the scope of the invention will be indicated in the claims.

SUMMARY OF THE INVENTION

The invention relates to novel ink compositions and methods of using such ink compositions, and more particularly to such compositions and methods wherein the fluorescent emission of ink under irradiation is maintained within relatively narrow limits of wavelength while the visual colors of the inks may vary widely for visual sorting and the like. The ink formulations generally comprise from 2 to 25 percent fluorescent pigments with 0.3 to 10 percent non-fluorescent pigments in a vehicle which contains surfactants and gels and/or antioxidants. The ink compositions are made from a combination of pigments including daylight fluorescent pigments which are solid solutions of fluorescent dyes in friable organic resins. Thus the pigment combinations provide a variety of colors to the eye or to an optical reader, but all provide for fluorescent emission within a relatively narrow wavelength to make it possible to machine read tickets, labels, mail or the like with a single setting of a fluorescent detector device while providing for a variety of visually differing colors in accordance with the method of the invention. The visual differing colors can be also optically read by a machine to provide a second mark or set of data from that read by the fluorescent detector. The visual color of the ink is a color other than red while the fluorescent color of the ink is preferably red or orange-red.

DESCRIPTION OF PREFERRED EMBODIMENTS OF THE INVENTION

In accordance with the method and ink composition of the invention, machine readable tickets, tags, labels, postage imprints and the like are provided with a visual color, i.e. a color under ordinary mixed light frequencies and a fluorescent radiation color which when irradiated with ultraviolet light, for example, fluoresces preferably in the red wavelength of about from 5800 A to 6200 A. Since there are existing machines for reading fluorescent ink imprinted information, a variety of visual colors can be employed with the fluorescent color of the ink being within the red portion of the spectrum. Thus the ink imprint may be read visually or by some other type of optical machine reader and then read by a fluorescent machine reader which is set to pick up the fluorescent wavelength of the ink. This is particularly useful in the field of postage imprinting since at large postal installations machines may be available to read postage information, but at many smaller or rural stations the postage imprint must be visually read. Further, by the use of a visual or optical color which is different from the fluorescent color a combination of information may be imprinted which is readable by two different machines, i.e. an optical reader which is responsive to the reflected color and/or shape of the imprint under ordinary mixed light and a fluorescent reader which responds to the particular fluorescent wavelength when the ink is irradiated.

The inks may have ordinary mixed light colors of orange, brown, purple, black, blue or green, for example, while emitting orange-red fluorescence when activated by long or short ultraviolet waves. The general formulation is a combination of fluorescent and optical pigments with the fluorescent pigments comprising about 2 to 25 percent and preferably about 10 to 20 percent by weight with the non-fluorescent pigments making up from about 0.3 to 10 percent and preferably from 0.5 to 2.5 percent by weight of the ink formulation. The pigments are carried in a vehicle which comprises about 75 to 95 percent of the ink by weight and preferably comprises a mixture of dioctyl phthalate and an aliphatic hydrocarbon having a distallation range of about 310° to 345°C., which is sold by East Coast Chemicals Co. as "Escoflex 175." The ratio of dioctyl phthalate to the aliphatic hydrocarbon is about 3:1 by weight. To the vehicle there is added about 0.25 to 1.5 percent surfactant and about 0.25 to 5 percent gellant all by weight. The preferred surfactant is lecithin and the preferred gellant is aluminum stearate having a high free stearic acid content made up as a 10 percent gel in a vehicle which is the same or is compatible with the ink vehicle. There may also be added up to about 1 percent antioxidant and the preferred antioxidant is eugenol.

The fluorescent pigments are dispersions in a heat-set type vehicle which comprises, for example, a suitable resin dissolved in a high boiling narrow fraction hydrocarbon solvent or are dispersions of the fluorescent pigments in a drying type alkyd resin such as Trionol No. 3 sold by Lawter Chemicals, Inc. The fluorescent pigments are solid solutions of fluorescent dyes in friable organic resins. A typical example would be a powdered thermo-plastic melamine-sulfonamide-formaldehyde resin which contains various dissolved fluorescent dyes wherein the resin is the matrix for the dye. The daylight fluorescent pigments preferred are thus modified sulfonamide resins containing fluorescent dye or dyes in solid solution. The other pigments used as set forth in the Examples below are used to impart the desired visual color which is substantially different from the fluorescent color under ultraviolet light. The visual pigments are generally in a heat-set type vehicle, a litho varnish or a mixture of dioctyl phthalate and an aliphatic hydrocarbon having a distillation range of about 310°C to 345°C in a ratio of about 3:1. This is set forth as PRV (porous roller vehicle) in the Examples below.

The following Examples are exemplary of the invention and should not be considered limiting.

EXAMPLE I

| Orange | % By Weight in Ink | Commercial Designation | % By Weight in Ink (incl. vehicle | Source |
|---|---|---|---|---|
| Strong Red Orange | 7.70 | D516 Dispersion | 15.40 | Lawter Chemicals, Inc. |
| Benzidine Yellow | 1.50 | FS1117 Thermex Flush | 6.00 | Chemetron Corp. |
| Brilliant Toning Red | 0.80 | FL-10-707 PRV Flush | 1.77 | Sherwin Williams Chemicals |
| Aluminum Stearate 132 | 0.50 | 10% Gel In PRV | 5.00 | Witco Chemical Corp. |
| Polyvinyl Chloride | 0.12 | Marvinol 50 3% Gel In PRV | 4.00 | Uniroyal, Inc. |
| Lecithin U.F. | 0.50 | Lecithin U.F. | 0.50 | A. E. Staley Mfg. Co. |
| Eugenol | 0.50 | Eugenol U.S.P. | 0.50 | Fritzsche Dodge & Alcott, Inc. |
| Vehicles | 88.38 | DOP PX-138 | 50.13 | U.S. Steel Corp. Chemical Div. |
|  |  | Escoflex 175 | 16.71 | East Coast Chemicals Co. |

The procedure used for a 100 pound batch of ink in accordance with this Example is as follows. First the Dioctyl Phthalate, Escoflex 175, Eugenol and Lecithin are weighed into a ten gallon tank and mixed to form the vehicle solution. The gel(s) and pigments are then weighed into a twenty gallon mixing vessel and blended with a mixer such as a Cowles mixer until the mixture is uniform which should take about 15 to 20 minutes. If there are any undispersed gels or pigments the stirring should continue until the mixture is uniform. The gel pigment dispersion is continued to be stirred and 1½ to 2 gallons of the vehicle solution is added to the dispersion and is stirred for a period of about 5 to 10 minutes before the addition of the remaining vehicle solution. The ink is then stirred for about 30 minutes more and is then strained through four to six layers of cheesecloth before it is run on an Eppenbach high-speed mixer for about 15 minutes. The ink is then allowed to stand for 10 hours or more (such as over night) and is then stirred for about 15 minutes with a propeller mixer and again for 15 additional minutes with a high-speed mixer, again allowed to stand for over 10 hours and is then stirred once more with a propeller mixer, after which it is ready for use.

EXAMPLE II

The procedure for preparing the ink in this Example is the same as that set forth in Example I, above, except that the formulation is as follows:

| Brown | % By Weight | Commercial Designation | % by Weight in Ink (incl. vehicle) | Source |
|---|---|---|---|---|
| High Intensity Yellow Orange | 13.98 | H6118 Dispersion | 27.96 | Lawter Chem. |
| Carbon Black | 0.87 | W-92 Flush | 3.06 | Chemetron Corp. |
| Phthalocyanine Green | 0.15 | 5-65-F-423 Flush | 0.43 | Hilton Davis Div. Sterling Drug, Inc. |
| Aluminum Stearate 132 | 0.50 | 10% Gel in PRV | 5.00 | |
| Lecithin U.F. | 0.50 | Lecithin U.F. | 0.50 | |
| Eugenol | 0.25 | Eugenol U.S.P. | 0.25 | |
| Vehicles | 83.75 | DOP PX-138 | 47.10 | |
|  |  | Escoflex 175 | 15.70 | |

EXAMPLE III

The procedure for preparing the ink in this Example is the same as that set forth in Example I, above, except that the formulation is as follows:

| Purple | | | | |
|---|---|---|---|---|
| Pink | 18.52 | H622 Dispersion | 37.04 | Lawter Chemicals |
| Alkali Blue G.G. | 0.37 | FL-15-403 Flush | 1.09 | Sherwin-Williams |
| Aluminum Stearate | 0.50 | 10% Gel in PRV | 5.00 | |
| Lecithin U.S. | 0.50 | Lecithin U.F. | 0.50 | |
| Eugenol U.S.P. | 0.25 | Eugenol U.S.P. | 0.25 | |
| Vehicles | 79.86 | DOP PX-138 | 42.09 | |
| | | Escoflex 175 | 14.03 | |

EXAMPLE IV

The procedure for preparing the ink in this Example is the same as that set forth in Example I, above, except that the formulation is as follows:

| Black | % By Weight | Commercial Designation | % By Weight in Ink (incl. Vehicle) | Source |
|---|---|---|---|---|
| Strong Yellow Orange | 17.09 | H618 Dispersion | 34.18 | |
| Alkali Blue G.G. | 0.73 | FL-15-403 | 2.15 | |
| Aluminum Stearate 132 | 0.50 | 10% Gel in PRV | 5.00 | |
| Lecithin U.F. | 0.50 | Lecithin U.F. | 0.50 | |
| Eugenol U.S.P. | 0.25 | Eugenol U.S.P. | 0.25 | |
| Vehicles | 80.93 | DOP PX-138 | 43.44 | |
| | | Escoflex 175 | 14.48 | |

EXAMPLE V

The procedure for preparing the ink in this Example is the same as that set forth in Example I, above, except that the formulation is as follows:

| Blue | | | | |
|---|---|---|---|---|
| Strong Red | 9.00 | H636 Dispersion | 18.00 | Lawter Chemicals |
| Phthalocyanine Blue | 1.00 | FS1116 Flush | 3.57 | Chemetron |
| Aluminum Stearate | 0.50 | 10% Gel in PRV | 5.00 | |
| Lecithin U.F. | 0.50 | Lecithin U.F. | 0.50 | |
| Eugenol | 0.25 | Eugenol U.S.P. | 0.25 | |
| Vehicles | 88.75 | DOP PX-138 | 54.51 | |
| | | Escoflex 175 | 18.17 | |

EXAMPLE VI

The procedure for preparing the ink in this Example is the same as that set forth in Example I, above, except that the formulation is as follows:

| Green | % By Weight | Commercial Designation | % By Weight in Ink (incl. Vehicle) | Source |
|---|---|---|---|---|
| Strong Yellow Orange | 10.55 | H618 Dispersion | 21.10 | |
| Phthalocyanine Green | 1.58 | 5-65-F-423 Flush | 4.51 | |
| Strong Lemon Yellow | 3.16 | D541 Dispersion | 6.32 | Lawter Chemicals |
| Aluuminum Stearate Aluminum 10% Gel in PRV | 5.00 | | | |
| Lecithin U.F. | 0.50 | Lecithin U.F. | 0.50 | |
| Eugenol | 0.25 | Eugenol U.S.P. | 0.25 | |
| Vehicles | 83.46 | DOP PX-138 | 46.74 | |
| | | Escoflex 175 | 15.58 | |

In the above Examples the same constituents contain a fraction of solids by weight which accounts for the differences in the percentages of the constituent alone versus the constituent-plus vehicle which is admixed to make the ink composition.

In the above Examples the aluminum stearate 132 has a high free steric acid content and the polyvinyl chloride used had an inherent viscosity of 1.20 and a specific viscosity of 0.50. The carbon black in the above Examples may be any suitable pigment black, and for the above Examples the carbon black was dispersed in a gloss-type vehicle. The non-fluorescent pigments are known such as benzidine yellow which is a common yellow pigment which is flushed in a heat-set type vehicle. The brilliant toning red pigment is also identified as Permanent Red 2B (Color Index 15865 - Pigment Red 48) which is flushed in porous roller vehicle. The phthalocyanine Green is Pigment Green 7 (Color Index 74260) which is flushed in a litho varnish. It is designated by the supplier (Hilton Davis) as Synthaline Green. The Alkali Blue GG is a well known Pigment Blue 19 (Color Index 42750A) which is also flushed in a litho varnish. The Phthalocyanine Blue is Pigment Blue 15 (Color Index 74160) which is flushed in a heat-set type vehicle.

The ink can be applied in a number of ways by stamps, from rollers or by an appropriate printing device. While fluorescent wavelengths of other than red or red-orange may be employed, a red or red-orange is preferred since there are existing detectors which are specifically designed for this wavelength of fluorescent radiation. In any event the fluorescent emission should be within certain limits of wavelength so that there is no need to continually adjust or reset the fluorescent detector each time a new color is being processed. Thus in accordance with the invention a number of visual colors may be imprinted, but will all be machine readable by at least the same fluorescent detector.

In practice, for example, when used for postage imprinting the ink may be carried on or in rollers, belts, pads, or the like for transferring the proper print configuration to a letter or postage imprint tape. Once imprinted the mail-carrying imprint with such ink can be checked visually by the human eye or, depending upon the postage imprint configuration, by an optical detector which may be activated by the reflection of ordinary mixed light from the postage imprint. The same or other portions of the postage imprint may be further read by a fluorescent detector when the postage imprint is subjected to, for example, ultraviolet radiation. Additional information contained in the postage imprint can be picked up by the fluorescent detector. Mail sorting and routing, as well as the machine verification of postage amounts and other such functions, can be facilitated by the dual emissive ink in accordance with the invention. Similarly, the method of the invention may be employed in the marking of retail price tickets and the like to provide dual emissive characteristics for machine sorting and/or compilation of sales or inventory information.

The ink may also be used to verify the source of products. Phonograph records, for example, may be marked with the dual emissive ink and by detection of the fluorescent color by the human eye or by machine, counterfeit records may be separated from the genuine ones. The ink may also be used in decorative displays wherein by changes from mixed light to fluorescent the design made with such an ink would change.

It will thus be seen that the objects set forth above, among those made apparent from the preceding description, are efficiently attained and since certain changes may be made in the above methods or in the compositions and formulations without departing from the scope of the invention, it is intended that all matter contained in the above description shall be interpreted as illustrative and not in a limiting sense.

What is claimed is:

1. A machine-readable marking ink composition having two or more mixed pigments for processing and distinguishing articles both visually and under radiation of a discrete predetermined wavelength, comprising
   A. from 0.5 to 10 percent non-fluorescent pigment by weight;
   B. from 2.0 to 25.0 percent fluorescent pigment by weight which fluoresces under radiation at a predetermined wavelength,
      1. said fluorescent pigment being taken from the group consisting of
         a. fluorescent pigment dispersions in a vehicle which comprises a resin dissolved in a narrow fraction petroleum distillate having a boiling range of from about 440°F. to 510°F.,
         b. fluorescent pigment dispersions in a drying type alkyd resin, or
         c. comminated solid solutions of fluorescent dyes in modified sulfonamide resins;
   C. from 0.25 to 1.5 percent surfactant by weight;
   D. from 0.25 to 5 percent gellant by weight; and
   E. all of said pigments, said surfactant and said gellant being in a vehicle for the mixed pigment system,
      1. said vehicle consisting essentially of a mixture of
         a. dioctyl phthalate and
         b. an aliphatic hydrocarbon having a distillation range of about 310°C. to 345°C.,
   whereby the color of the ink under mixed light is different than the fluorescent color of the ink when irradiated at the fluorescent wavelength of said fluorescent pigment.

2. The machine-readable marking ink of claim 1 wherein the fluorescent wavelength of said fluorescent pigment is from 5800 A to 6200 A.

3. The machine-readable marking ink of claim 1 wherein said surfactant is lecithin and said gellant is aluminum stearate.

4. The machine-readable marking ink composition defined in claim 1 wherein said vehicle consists substantially of a mixture of said dioctyl phthalate and said aliphatic hydrocarbon in a ratio of about 3:1.

* * * * *